Feb. 1, 1966 H. VISSERS 3,232,035
APPARATUS FOR PICKING UP CROP, SUCH AS GRASS
AND HAY LYING ON THE GROUND
Filed Aug. 3, 1964
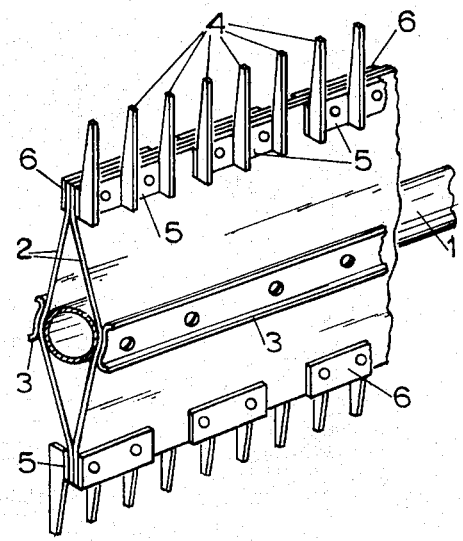
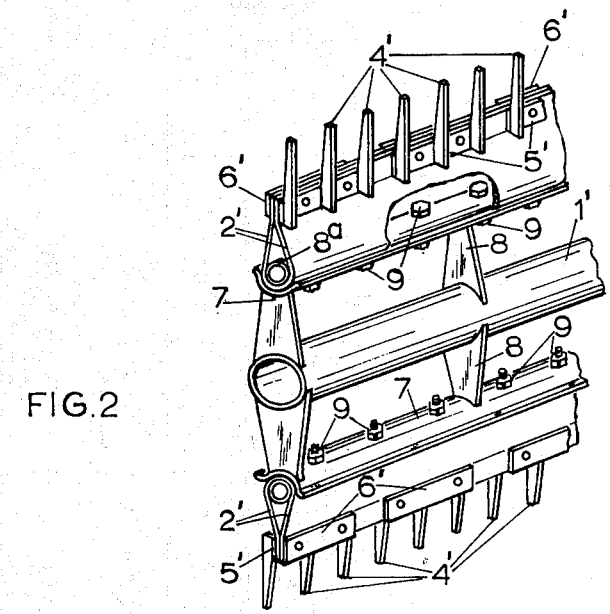
INVENTOR
HERBERT VISSERS
BY
ATTORNEYS.

United States Patent Office 3,232,035
Patented Feb. 1, 1966

3,232,035
APPARATUS FOR PICKING UP CROP, SUCH AS GRASS AND HAY LYING ON THE GROUND
Herbert Vissers, Nieuw Vennep, Netherlands, assignor to Landbouwwerktuigen- en Machinefabriek H. Vissers N.V., Nieuw Vennep, Netherlands, a company of the Netherlands
Filed Aug. 3, 1964, Ser. No. 387,048
3 Claims. (Cl. 56—364)

The invention relates to an apparatus for picking up crop, such as grass, hay and the like, lying on the ground, said apparatus having a shaft provided with a drive and supported in a traveling frame, and said shaft carrying one or more holders extending parallel to the shaft and having more or less radially directed stiff teeth.

In order to allow the tooth to follow unevennesses of the ground it has been proposed to make the tooth of spring steel or other elastic material, but then the drawback occurs that the tooth can be broken under the influence of fatigue, so that replacement of teeth is required. Further the difficulty occurs that the teeth, upon getting stuck at an unevenness of the ground are often not released.

The invention has for its object to remove said drawback of elastic teeth and to yet allow the teeth to yield elastically. According to the invention, the holder for the teeth comprises at least one strip of flexible material to which two or more succeeding teeth or groups of teeth are secured. Said strips may be formed from rubber, plastic, canvas or also of thin sheet metal and by virtue of the flexibility of said material each tooth or each group of teeth may elastically yield when striking an unevenness of the ground. The adjacent tooth or groups of teeth will then assist the arrested tooth to pass the unevenness as the flexible strip connects the teeth or groups of teeth with each other.

The invention will be further described with reference to the accompanying drawing, illustrating two embodiments of a teeth mounting according to the invention.

In the drawing FIG. 1 is a perspective view of part of the holder with teeth having the flexible strips directly attached to the shaft.

FIG. 2 shows a similar view as FIG. 1 of an embodiment in which the flexible strips are each passed around a tube extending parallel to the shaft.

In the embodiment shown in FIG. 1, two flexible strips 2 through the intermediary of a strip 3 of sheet metal by means of bolts are clamped diametrically opposed on the shaft 1. The strips 2 constitute a flexible supporting member. The flexible strips 2 are clamped against each other at their longitudinal outer edge portions by plates 5 and counter plates 6. The plate 5 carry a rigid tooth or a group of rigid teeth 4. By virtue of the provision of the flexible strips 2, each tooth in a group or each group of teeth 4 may yield elastically independent of the other teeth, though the teeth themselves are fully stiff or rigid.

In the embodiment shown in FIG. 2, two bars 7 having a gutter-like section are secured to shaft 1' by radial arms 8. The flexible strips 2' are of generally U-shaped configuration and each have a web portion passed around a tube or rod 8a and clamped with said tube or rod on the cradle bar 7 by means of bolts 9. Each strip 2', which constitutes a flexible supporting member for the teeth, has its longitudinal outer free edges clamped between the plate 5' of a group of teeth 4' and the counter plate 6'. Said arrangement is particularly suitable for reels or rotors of larger diameter and the embodiment of FIG. 1 is more suitable for reels of smaller diameter.

What I claim is:

1. In an apparatus for picking up crops, such as hay, grass and the like, lying on the ground; a reel comprising a rotatable shaft, a strip-like supporting member of flexible material connected to the shaft and extending along the axis of the shaft and radiating therefrom, means securing the member to the shaft, said member having an outer end portion spaced radially from the shaft, a group of rigid axially spaced teeth radially extending from the outer end portion of the supporting member and means securing said group of rigid teeth to the outer end portion of said supporting member whereby the group of the teeth or any one tooth of the group can elastically yield when striking the ground or an object thereon by virtue of the flexible supporting member.

2. The invention of claim 1, wherein said member includes two complementary strips having central portions, said strips being disposed on diametrically opposing portions of the shaft, said means securing the member to the shaft including clamping means fixing the central portions of the strips to the shaft at the diametrically opposing portions thereof, said strips having adjoining outer end portions which constitute the outer end portion of the member, and said means securing the group of teeth including plates carrying the teeth and clamping the outer end portions of the strips together.

3. The invention of claim 1, wherein said member includes a substantially U-shaped strip having a web portion and free adjoining outer ends which constitute the outer end portion of the member, said securing means for the group of teeth clamping the ends together, said means securing the member to the shaft including a reinforcing rod extending parallel to the shaft and fixed within the web portion, arms radiating from and connected to the shaft and means fastening the web portion of the strip and the rod to the arms.

References Cited by the Examiner
UNITED STATES PATENTS

| | | | |
|---|---|---|---|
| 1,196,237 | 8/1916 | Holm | 15—183 |
| 1,715,306 | 5/1929 | Peterson | 56—220 |
| 2,552,382 | 5/1951 | Root | 15—183 |
| 2,840,975 | 7/1958 | Koller | 56—219 |
| 2,906,706 | 9/1959 | McCarty et al. | 56—364 |
| 3,126,693 | 3/1964 | Renn | 56—364 |

ABRAHAM G. STONE, Primary Examiner.
RUSSELL R. KINSEY, Examiner.
M. C. PAYDEN, Assistant Examiner.